US010488243B2

(12) United States Patent
Gold et al.

(10) Patent No.: US 10,488,243 B2
(45) Date of Patent: Nov. 26, 2019

(54) GAS FLOW CHARACTERIZATION IN ADDITIVE MANUFACTURING

(71) Applicant: General Electric Company, Schenectady, NY (US)

(72) Inventors: Scott Alan Gold, Waynesville, OH (US); James Harding Shealy, Dayton, OH (US); Lucas Christian Jones, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/430,770

(22) Filed: Jun. 4, 2019

(65) Prior Publication Data

US 2019/0285455 A1 Sep. 19, 2019

Related U.S. Application Data

(63) Continuation of application No. 16/144,386, filed on Sep. 27, 2018, now Pat. No. 10,352,750, which is a continuation of application No. 15/972,742, filed on May 7, 2018, now Pat. No. 10,113,894, which is a continuation of application No. 14/947,943, filed on Nov. 20, 2015, now Pat. No. 9,989,396.

(51) Int. Cl.
| | | |
|---|---|---|
| *G01F 15/14* | (2006.01) | |
| *B22F 3/105* | (2006.01) | |
| *G01P 5/26* | (2006.01) | |
| *G01P 5/00* | (2006.01) | |
| *B33Y 50/02* | (2015.01) | |
| *B33Y 10/00* | (2015.01) | |
| *B33Y 30/00* | (2015.01) | |
| *B29C 64/153* | (2017.01) | |
| *B29C 64/364* | (2017.01) | |

(52) U.S. Cl.
CPC ............ *G01F 15/14* (2013.01); *B22F 3/1055* (2013.01); *B33Y 50/02* (2014.12); *G01P 5/00* (2013.01); *G01P 5/26* (2013.01); *B22F 2003/1056* (2013.01); *B22F 2003/1057* (2013.01); *B22F 2999/00* (2013.01); *B29C 64/153* (2017.08); *B29C 64/364* (2017.08); *B33Y 10/00* (2014.12); *B33Y 30/00* (2014.12)

(58) Field of Classification Search
CPC .......... G01F 15/14; G01P 5/26; B33Y 50/02; B33Y 30/00; B33Y 10/00; B29C 64/153; B29C 64/364; B22F 3/1055; B22F 2999/00; B22F 2003/1056
See application file for complete search history.

(56) References Cited

U.S. PATENT DOCUMENTS

| | | | |
|---|---|---|---|
| 2011/0061591 A1* | 3/2011 | Stecker ................. | B22F 3/1055 118/663 |
| 2011/0217208 A1* | 9/2011 | Narendrnath ............ | G01F 1/20 422/86 |

(Continued)

*Primary Examiner* — Francis C Gray
(74) *Attorney, Agent, or Firm* — Dority & Manning, P.A.

(57) ABSTRACT

A method of characterizing gas flow within a housing includes: positioning one or more gas flow sensors in the housing; introducing a gas flow into the housing; using the one or more gas flow sensors to generate two or more gas flow measurements at spaced-apart locations within the housing; and recording the two or more measurements to create a gas flow map.

20 Claims, 4 Drawing Sheets

(56) References Cited

U.S. PATENT DOCUMENTS

| | | | |
|---|---|---|---|
| 2016/0045981 A1* | 2/2016 | Zurecki | B33Y 10/00 |
| | | | 219/76.12 |
| 2017/0056970 A1* | 3/2017 | Chin | B33Y 30/00 |
| 2017/0146488 A1* | 5/2017 | Gold | B22F 3/1055 |
| 2017/0173697 A1* | 6/2017 | Myerberg | B22F 3/008 |

* cited by examiner

GAS FLOW CHARACTERIZATION IN ADDITIVE MANUFACTURING

CROSS-REFERENCE TO RELATED APPLICATIONS

This application is a continuation of U.S. application Ser. No. 16/144,386, filed on Sep. 27, 2018, and entitled GAS FLOW CHARACTERIZATION IN ADDITIVE MANUFACTURING, which is a continuation of U.S. application Ser. No. 15/972,742, filed on May 7, 2018, and entitled GAS FLOW CHARACTERIZATION IN ADDITIVE MANUFACTURING, which is a continuation of U.S. application Ser. No. 14/947,943, filed on Nov. 20, 2015 and entitled GAS FLOW CHARACTERIZATION IN ADDITIVE MANUFACTURING, which are hereby expressly incorporated herein by reference in their entirety.

BACKGROUND

The present subject matter relates generally to additive manufacturing, and more particularly to apparatus and methods for gas flow characterization in additive manufacturing.

Additive manufacturing is a process in which material is built up layer-by-layer to form a component. Additive manufacturing is limited primarily by the position resolution of the machine and not limited by requirements for providing draft angles, avoiding overhangs, etc. which are required by casting. Additive manufacturing is also referred to by terms such as "layered manufacturing," "reverse machining," "direct metal laser melting" (DMLM), and "3-D printing". Such terms are treated as synonyms for purposes of the present disclosure.

One type of additive manufacturing machine is referred to as a "powder bed" machine and includes a build chamber that encloses a mass of powder which is selectively fused by a laser to form a workpiece. The build chamber is enclosed in a housing that typically includes provisions for a flow of shielding gas therein. The shielding gas is used to transfer heat away from the surface of the power bed, and to prevent vaporized powder from condensing on the surface of the workpiece.

One problem with prior art additive manufacturing machines is that the gas flow velocity varies over the build surface and throughout the build chamber. Specifically, the gas flow decelerates as it passes over the surface, because of normal pressure and friction losses. The velocity may also be inconsistent in a direction perpendicular to flow. Because of this variation, the gas flow rate may be acceptable in one location but too high or too low in another.

BRIEF DESCRIPTION

At least one of these problems is addressed by a method of characterizing gas flow in an additive manufacturing process.

According to one aspect of the technology described herein, a method of characterizing gas flow within a housing includes: positioning one or more gas flow sensors in the housing; introducing a gas flow into the housing; using the one or more gas flow sensors to generate two or more gas flow measurements at spaced-apart locations within the housing; and recording the two or more measurements to create a gas flow map.

According to another aspect of the technology described herein, an apparatus for characterizing the gas flow within a housing includes at least one gas flow sensor configured to generate two or more gas flow measurements at spaced-apart locations within the housing.

BRIEF DESCRIPTION OF THE DRAWINGS

The present subject matter may be best understood by reference to the following description taken in conjunction with the accompanying drawing figures in which.

DETAILED DESCRIPTION

Figure 1:
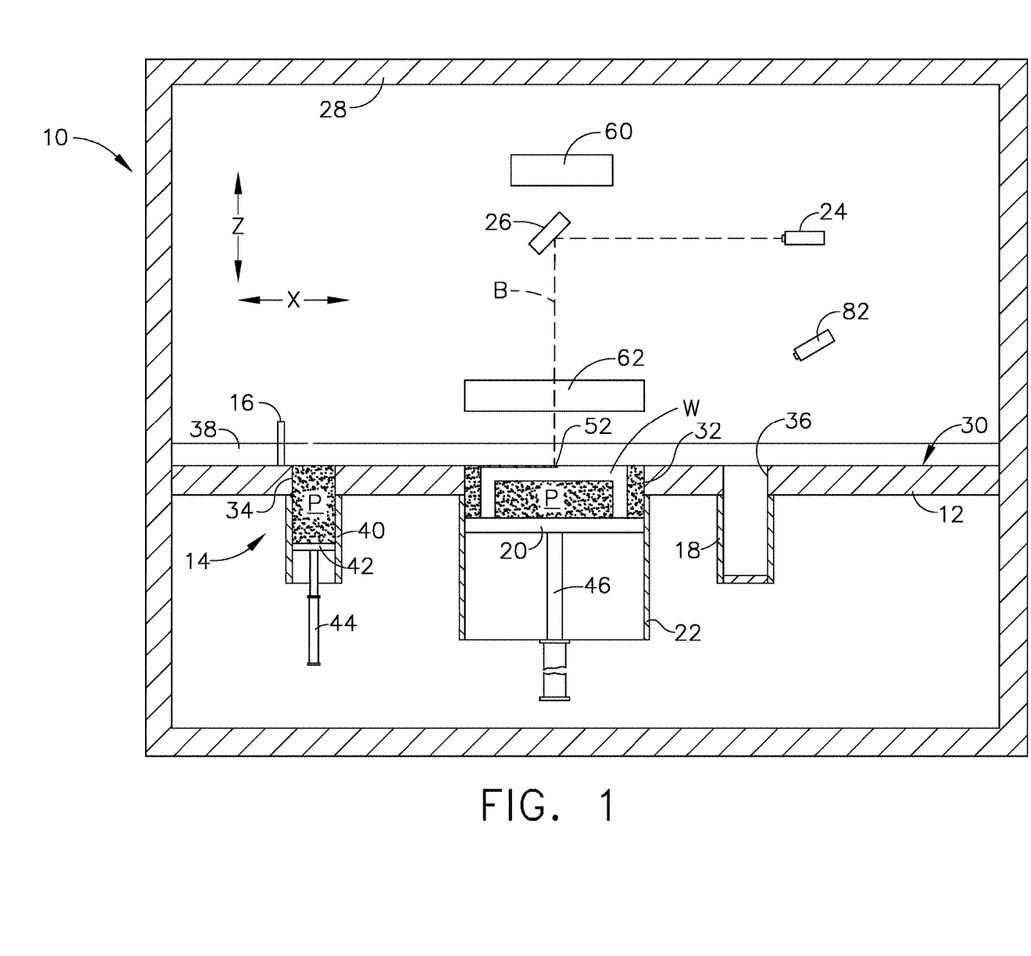
FIG. 1 is a schematic, partially-sectioned front elevation view of an exemplary additive manufacturing machine.

Referring to the drawings wherein identical reference numerals denote the same elements throughout the various views, FIG. 1 illustrates schematically an additive manufacturing machine 10 suitable for carrying out an additive manufacturing method. Basic components of the machine 10 include a table 12, a powder supply 14, a recoater 16, an overflow container 18, a build platform 20 surrounded by a build chamber 22, a directed energy source 24, and a beam steering apparatus 26, all surrounded by a housing 28. Each of these components will be described in more detail below.

The table 12 is a rigid structure defining a planar worksurface 30. The worksurface 30 is coplanar with and defines a virtual workplane. In the illustrated example it includes a build opening 32 communicating with the build chamber 22 and exposing the build platform 20, a supply opening 34 communicating with the powder supply 14, and an overflow opening 36 communicating with the overflow container 18.

The recoater 16 is a rigid, laterally-elongated structure that lies on the worksurface 30. It is connected to an actuator 38 operable to selectively move the recoater 16 along the worksurface 30. The actuator 38 is depicted schematically in FIG. 1, with the understanding devices such as pneumatic or hydraulic cylinders, ballscrew or linear electric actuators, and so forth, may be used for this purpose.

The powder supply 14 comprises a supply container 40 underlying and communicating with the supply opening 34 and an elevator 42. The elevator 42 is a plate-like structure that is vertically slidable within the supply container 40. It is connected to an actuator 44 operable to selectively move the elevator 42 up or down. The actuator 44 is depicted schematically in FIG. 1, with the understanding that devices such as pneumatic or hydraulic cylinders, ballscrew or linear electric actuators, and so forth, may be used for this purpose. When the elevator 42 is lowered, a supply of powder "P" of a desired composition (for example, metallic, ceramic, and/or organic powder) may be loaded into the supply container 40. When the elevator 42 is raised, it exposes the powder P above the worksurface 30. Other types of powder supplies may be used; for example, powder may be dropped into the build chamber 22 by an overhead device (not shown).

The build platform 20 is a plate-like structure that is vertically slidable below the build opening 32. It is connected to an actuator 46 operable to selectively move the build platform 20 up or down. The actuator 46 is depicted schematically in FIG. 1, with the understanding that devices such as pneumatic or hydraulic cylinders, ballscrew or linear electric actuators, and so forth, may be used for this purpose.

When the build platform 20 is lowered into the build chamber 22 during a build process, the build chamber 22 and the build platform 20 collectively surround and support a mass of powder P along with any components being built. This mass of powder is generally referred to as a "powder bed", and this specific category of additive manufacturing process may be referred to as a "powder bed process".

The overflow container 18 underlies and communicates with the overflow opening 36, and serves as a repository for excess powder P.

The directed energy source 24 may comprise any device operable to generate a beam of suitable power and other operating characteristics to fuse or melt the powder P during the build process, described in more detail below. For example, the directed energy source 24 may be a laser.

The beam steering apparatus 26 may include one or more mirrors, prisms, electromagnets, and/or lenses and may be provided with suitable actuators, and arranged so that a beam "B" from the directed energy source 24 can be focused to a desired spot size and steered to a desired position in plane coincident with the worksurface 30. For purposes of convenient description, this plane may be referred to as an X-Y plane, and a direction perpendicular to the X-Y plane is denoted as a Z-direction (X, Y, and Z being three mutually perpendicular directions). The beam B may be referred to herein as a "build beam".

A basic build process for a workpiece W using the apparatus described above is as follows. The build platform 20 is moved to an initial high position. The build platform 20 is lowered below the worksurface 30 by a selected layer increment. The layer increment affects the speed of the additive manufacturing process and the resolution of the workpiece W. As an example, the layer increment may be about 10 to 50 micrometers (0.0003 to 0.002 in.). Powder "P" is then deposited over the build platform 20 for example, the elevator 42 of the supply container 40 may be raised to push powder through the supply opening 34, exposing it above the worksurface 30. The recoater 16 is moved across the worksurface to spread the raised powder P horizontally over the build platform 20. Any excess powder P drops through the overflow opening 36 into the overflow container 18 as the recoater 16 passes from left to right. Subsequently, the recoater 16 may be moved back to a starting position. The leveled powder P may be referred to as a "build layer" and the exposed upper surface thereof may be referred to as a "build surface".

The directed energy source 24 is used to melt a two-dimensional cross-section or layer of the workpiece W being built. The directed energy source 24 emits a beam "B" and the beam steering apparatus 26 is used to steer a focal spot of the build beam B over the exposed powder surface in an appropriate pattern. A small portion of exposed layer of the powder P surrounding the focal spot, referred to herein as a "weld pool" 52 (best seen in FIG. 2) is heated by the build beam B to a temperature allowing it to melt, flow, and consolidate. As an example, the weld pool 52 may be on the order of 100 micrometers (0.004 in.) wide. This step may be referred to as fusing the powder P.

The build platform 20 is moved vertically downward by the layer increment, and another layer of powder P is applied in a similar thickness to the first layer. The directed energy source 24 again emits a build beam B and the beam steering apparatus 26 is used to steer the focal spot of the build beam B over the exposed powder surface in an appropriate pattern. The exposed layer of the powder P is heated by the build beam B to a temperature allowing it to melt, flow, and consolidate both within the top layer and with the lower, previously-solidified layer.

This cycle of moving the build platform 20, applying powder P, and then directed energy melting the powder P is repeated until the entire workpiece W is complete.

The machine 10 and its operation are as representative example of a "powder bed machine". It will be understood that the principles described here are applicable to other configurations of powder bed machines, as well as other machines utilizing a protective gas environment.

The housing 28 serves to isolate and protect the other components of the machine 10. The housing 28 is generically representative of any enclosure, chamber, or similar structure that is effective to create a closed or semi-closed environment. For example, a room of a building could serve as a housing. During the build process described above, the housing 28 is provided with a flow of an appropriate shielding gas which, among other functions, excludes oxygen from the build environment. To provide this flow, the machine 10 may be coupled to a gas flow apparatus 54, seen in FIG. 2. The exemplary gas flow apparatus 54 includes, in serial fluid flow communication, a variable-speed fan 56, a filter 58, upper and lower inlet ducts 60 and 62 respectively, communicating with the housing 28, and a return duct 64 communicating with the housing 28. All of the components of the gas flow apparatus 54 are interconnected with suitable ducting and define a gas flow circuit in combination with the housing 28.

Figure 2:
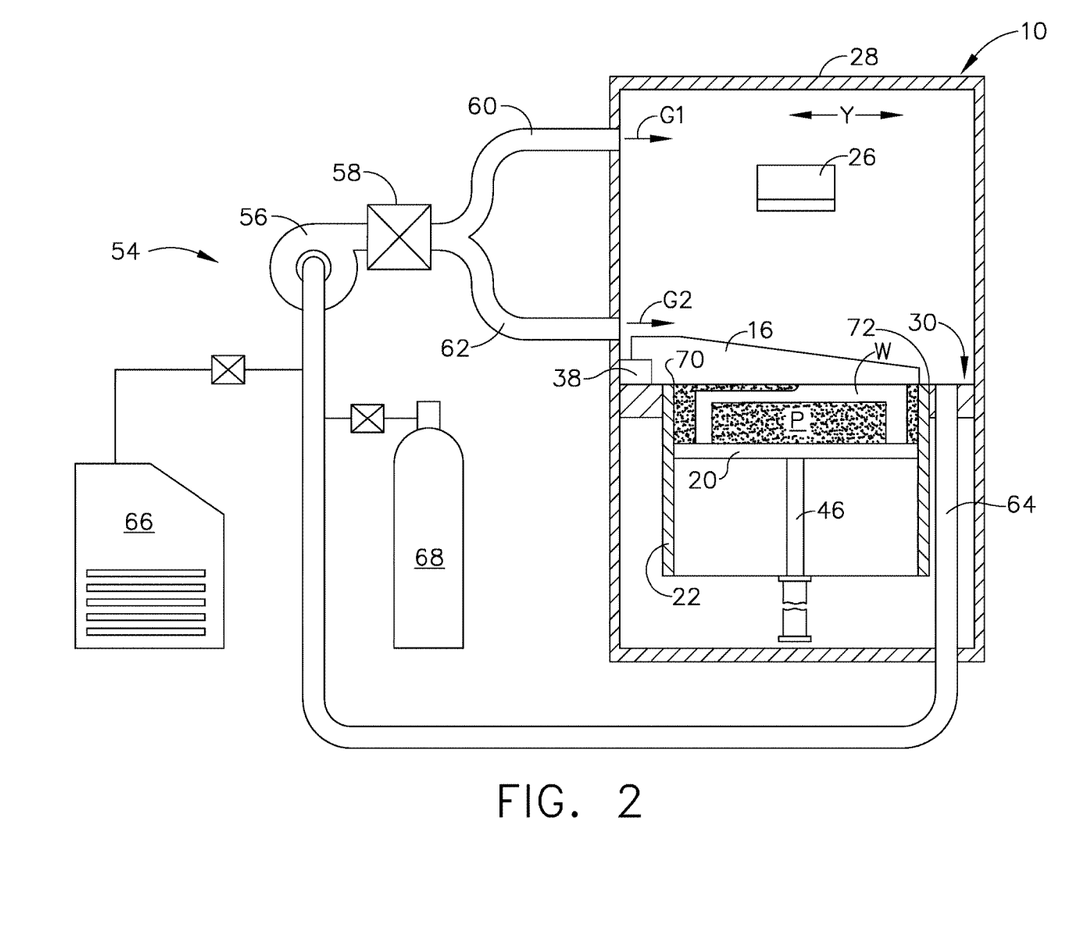
FIG. 2 is a schematic, partially-sectioned side elevation view of the machine of FIG. 1.

The composition of the gas used may be similar to that used as shielding gas for conventional welding operations. For example, gases such as nitrogen, argon, or mixtures thereof may be used. Any convenient source of gas may be used. For example, if the gas is nitrogen, a conventional nitrogen generator 66 may be connected to the gas flow apparatus 54. Alternatively, the gas could be supplied using one or more pressurized cylinders 68.

Once the gas flow apparatus 54 and machine 10 are initially purged with gas, the fan 56 is used to recirculate the gas through the gas flow circuit in a substantially closed loop, so as to maintain the positive pressure described above, with additional added makeup gas added as needed. Increasing the fan speed increases the velocity and flow rate of gas in the gas flow circuit; conversely, decreasing the fan speed decreases the velocity and flow rate of gas in the gas flow circuit. As an alternative to recirculation, the gas flow apparatus 54 could operate in a total loss mode; for example instead of the gas flowing through the return duct 64 and back to the fan 56, it could simply be vented to atmosphere after passing over the build chamber 22. In the illustrated example, the thermal mass of the gas provides a heat transfer function, however an optional heat exchanger (not shown) could be incorporated into the gas flow apparatus 54.

The upper inlet duct 60 is positioned near the top of the housing 28. During operation it provides a first stream or flow of gas (see arrow "G1") to keep particulates away from the beam steering apparatus 26 and other optical components of the machine 10.

The lower inlet duct 62 is positioned near the bottom of the housing 28. During operation, it provides a section stream or flow of gas (see arrow "G2"). As seen in FIG. 1, the lower inlet duct 62 has an elongated shape (for example rectangular) and discharges gas across the width of the build chamber 22. For reference purposes, the width of the build chamber 22 may be considered parallel to the "X" direction. As shown in FIG. 2, the edge of the build chamber 22 closest to the upper inlet duct 62 is referred to as a "leading edge"

70, and the opposite parallel edge is referred to as a "trailing edge" 72. For reference purposes, the length of the build chamber (i.e. distance from leading edge 70 to trailing edge 72) may be considered parallel to the "Y" direction.

The second gas flow G2 has two functions. First, it is used to effect heat transfer and carry heat away from the surface of the uppermost built layer within the build chamber 22. Second, during the build process, some of the powder P is vaporized. This vapor can cool and condense on the surface of the workpiece W, in turn causing an undesirable surface roughness or "recast" layer. Part of the second gas flow G2 is used to carry away the vapors and/or condensate.

It has been demonstrated that the gas flow velocity varies over the surface of the build chamber 22. For example, the gas flow decelerates as it passes over the surface parallel to the Y direction, because of normal pressure and friction losses. It may also be inconsistent in the X direction. Overall, the flow pattern may have complex characteristics in the X, Y, and Z directions. The specific gas flow pattern will vary from machine-to-machine and can vary over time for one machine because of wear, filter plugging, or similar causes.

If the gas flow velocity over a particular location is too high, it can disturb the powder in the build chamber 22. If the gas flow velocity is too low, it will provide insufficient heat transfer and vapor removal, resulting in measurably worse surface finish and mechanical properties. Because of the complex nature of the flow pattern described above, the gas flow can be acceptable in some parts of the build chamber 22 and unacceptable in others.

In such circumstances, simple single-point gas flow measurement may not be sufficient to ensure adequate flow over the entire surface of the build chamber 22. Accordingly, means may be provided to characterize the gas flow within the housing 28, more specifically positional "mapping" of the gas flow, in two or three dimensions.

To enable gas flow characterization, the machine 10 may be provided with at least one gas flow sensor. Any type of sensor operable to generate a signal indicative of a gas flow measurement may be used. As used herein "gas flow measurement" refers to any measurement that quantifies gas flow. Examples of gas flow measurements include but are not limited to velocity, dynamic pressure, volume flow rate, or mass flow rate. Nonlimiting examples of gas flow sensors include mechanical or solid-state anemometers (for example a hot-wire anemometer, sonic anemometer, or laser Doppler anemometer), pitot tubes or other differential pressure-based devices, or combinations of sensors operable to quantify flow (e.g. speed-density systems).

Figure 3:
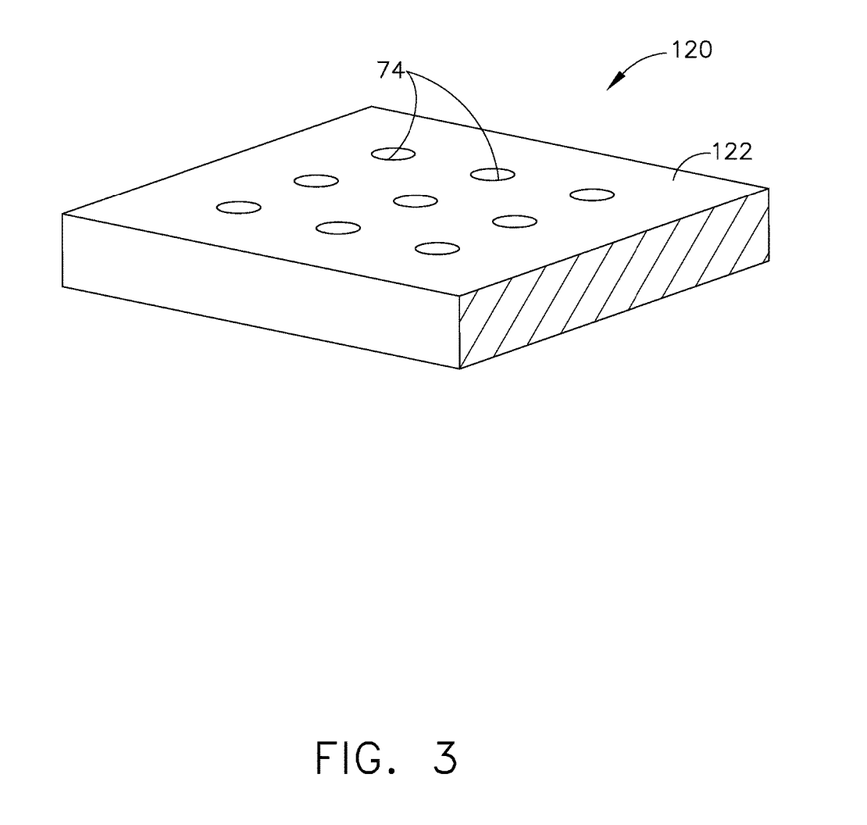
FIG. 3 is a schematic, perspective view of a build platform useable with the machine of FIG. 1.

In the example shown in FIG. 3, a modified build platform 120, otherwise similar to build platform 20 described above, is provided with an array of spaced-apart gas flow sensors 74 in communication with its upper surface 122. The location of the gas flow sensors 74 are thus fixed and known. In operation, each gas flow sensor 74 generates an independent gas flow measurement. This permits positional mapping of the gas flow over the build platform 20, relative to the X and Y directions. Alternatively, the gas flow sensors 74 could be positioned at other fixed locations within the housing 28.

Figure 4:
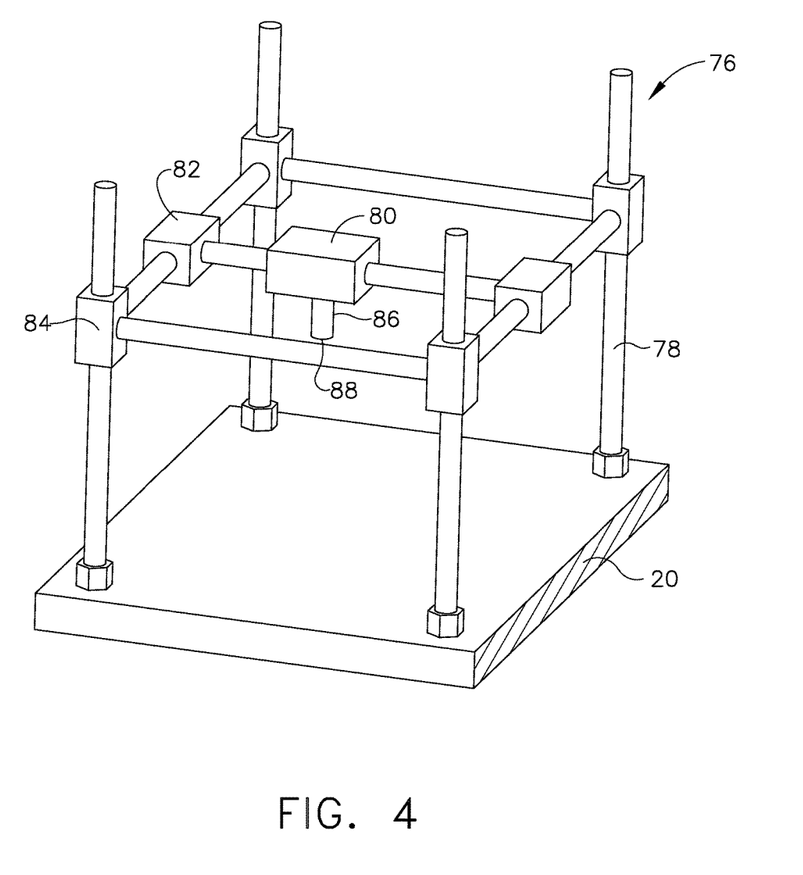
FIG. 4 is a schematic, perspective view of a gantry useable with the machine of FIG. 1.

In the example shown in FIG. 4, a gantry 76 is disposed above the build platform 20. The gantry 76 has a frame 78 with first, second and third actuators 80, 82, and 84, to drive a mount 86 in X, Y, and Z-directions, respectively. The mount 86 carries a gas flow sensor 88. The structure of the gantry 76 may be configured so as to minimize any gas flow disturbances. For example, the frame 78 may be constructed from slender rods, rails, or other similar elements. In operation, the gas flow sensor 88 is used to generate a gas flow measurement at multiple locations. This permits positional mapping of the gas flow over the build platform 20, relative to the X, Y, and Z directions. The gantry 76 may be considered as generally representative of a "sensor support".

An example of a gas flow characterization process is as follows. The housing 28 is provided with appropriate gas flow sensors as described above. This would typically be done in an empty condition (i.e. no powder or workpiece present). If integral sensors are used as shown in FIG. 3, the build plate 120 may be raised to an uppermost position. For cost reasons, the build plate 120 may be installed for the gas flow characterization process, then removed and replaced with a standard build plate 20. This allows the build plate 122 be reused for multiple measurements. If the gantry 74 is used, it would be positioned over the build plate 20 and the housing 28 would be closed. The housing 28 would then be prepared by using the gas flow apparatus 54 to purge air out of the machine 10 and allow the gas flow to reach steady state condition. Recording of gas flow measurements may then take place. If the gantry 74 is used, the mount 86 would be moved to a plurality of different positions and a measurement taken in each position. The resulting data may include a plurality of gas flow measurements, with corresponding positional information. This information may be referred to collectively as a "gas flow map". The gas flow map may be stored, for example, as a matrix, table, or electronic data file.

The gas flow map may be used for various purposes. For example, it may be used for machine qualification. In this process, the gas flow sensors would be used to characterize the gas flow and produce a gas flow map before the machine 10 is used for the first time. This gives a baseline for subsequent measurements, and also gives the user information about the machine 10. For example, a specific machine 10 may be known to have a particular flow pattern that may require higher than average gas flow settings to achieve acceptable flow patterns during the build process. The baseline gas flow map may be compared to a predetermined standard gas flow map, and the machine 10 adjusted such that the baseline gas flow map matches or more closely approximate the standard gas flow map.

As another example, the method may be used for machine calibration. In this process, the gas flow sensors described above would be used to characterize the gas flow and produce a gas flow map at regular intervals, for example every three to six months. The series of gas flow maps could be compared to the baseline gas flow map and/or to each other. This could help identify a change in the machine characteristics. For example if a gas duct becomes clogged, the gas flow map would change. Corrective action could take the form of machine maintenance or repairs. Alternatively, process parameters such as gas flow rate could be modified in subsequent builds (manually or automatically) to compensate for machine degradation. For example, prior to a build, the flow could be mapped. If the map does not match the predetermined standard or baseline gas flow map, then adjustments could be made to machine parameters.

The operation of the apparatus described above including the machine 10 and gas flow apparatus 54 may be controlled, for example, by software running on one or more processors embodied in one or more devices such as a programmable logic controller ("PLC") or a microcomputer (not shown). Such processors may be coupled to the sensors and operating components, for example, through wired or wireless connections. The same processor or processors may be used to retrieve and analyze sensor data, for statistical analysis, and for feedback control.

The method described herein has several advantages over the prior art. In particular, it provides consistent, adequate gas flow while minimizing the flow of gas. This has the potential to reduce workpiece variation and scrap rate, improve part quality, and monitor the condition of the machine 10.

The foregoing has described an apparatus and method for gas flow characterization in an additive manufacturing process. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The present subject matter is not restricted to the details of the foregoing embodiment(s). The present subject matter extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A system for characterizing a gas flow within a housing enclosing an additive manufacturing machine, the system comprising:
   one or more processors communicatively coupled with one or more gas flow sensors positioned within the housing, the one or more processors configured to:
      receive data indicative of a gas flow measurement at each of a plurality of locations within the housing, wherein the gas flow measurements are sensed by the one or more gas flow sensors and wherein the plurality of locations are spaced from one another; and
      generate a gas flow map based at least in part on the received data indicative of the gas flow measurement at each of the plurality of locations.

2. The system of claim 1, wherein the plurality of locations include a first location located along a build surface of a build plate of the additive manufacturing machine enclosed within the housing and a second location located along the build surface of the build plate.

3. The system of claim 1, wherein the one or more gas flow sensors include a plurality of gas flow sensors in communication with a build surface of a build plate of the additive manufacturing machine enclosed within the housing.

4. The system of claim 3, wherein the plurality of gas flow sensors each generate an independent one of the gas flow measurements.

5. The system of claim 3, wherein each of the plurality of gas flow sensors are positioned in known and fixed locations.

6. The system of claim 1, wherein the one or more sensors are a single gas flow sensor movable between a plurality of positions.

7. The system of claim 6, wherein the single gas flow sensor is carried by a mount drivable along at least two directions.

8. The system of claim 6, wherein the data received by the one or more processors is indicative of a current position of the single gas flow sensor, and
   wherein the one or more processors generate the gas flow map based at least in part on the received data indicative of the current position of the single gas flow sensor.

9. The system of claim 1, wherein the one or more processors are further configured to:
   compare the generated gas flow map to a baseline gas flow map; and
   cause a corrective action based at least in part on a difference between the generated gas flow map and the baseline gas flow map.

10. The system of claim 9, wherein in causing the corrective action, the one or more processors are configured to:
   cause a gas flow apparatus in communication with an environment defined by the housing to change a gas flow rate of the gas flow into the environment.

11. A system for characterizing a gas flow within an environment defined by a housing, the system comprising:
   an additive manufacturing machine enclosed within the environment defined by the housing, the additive manufacturing machine having a build chamber and a build plate;
   a gas flow apparatus having a variable speed fan for moving a gas into the environment such that the gas flows across at least a portion of the build plate; and
   at least one gas flow sensor configured to generate two or more gas flow measurements at spaced-apart locations, each of the two or more gas flow measurements being indicative of the gas flow of the gas over the build plate.

12. The system of claim 11, wherein the build chamber has a leading edge and a trailing edge, and wherein the gas is moved into the environment such that the gas flows across the build plate from the leading edge to the trailing edge.

13. The system of claim 11, wherein at least one of the two or more gas flow measurements is generated along an upper surface of the build plate.

14. The system of claim 11, wherein at least two of the two or more gas flow measurements are generated along an upper surface of the build plate.

15. The system of claim 11, wherein the build plate is movable within the build chamber.

16. The system of claim 11, wherein the at least one gas flow sensor is a single gas flow sensor movable between a plurality of positions such that the single gas flow sensor generates the two or more gas flow measurements at spaced-apart locations.

17. The system of claim 11, wherein the single gas flow sensor is carried by a mount drivable along at least three directions including a vertical direction and at least two directions orthogonal to the vertical direction.

18. An additive manufacturing machine, comprising:
   a housing defining an environment;
   a build chamber positioned within the environment defined by the housing;
   a build plate disposed at least in part within the build chamber, the build plate having at least two gas flow sensors configured to generate two or more gas flow measurements at spaced-apart locations.

19. The additive manufacturing machine of claim 18, wherein the build plate has a build surface, and wherein the at least two gas flow sensors are in communication with the build surface of the build plate.

20. The additive manufacturing machine of claim 17, wherein the at least two gas flow sensors are positioned in known and fixed locations.

* * * * *